United States Patent [19]

Harp

[11] Patent Number: 5,129,778
[45] Date of Patent: Jul. 14, 1992

[54] CONTAINER LOADING AND UNLOADING

[75] Inventor: James J. Harp, Annandale, Va.

[73] Assignee: Admiralty Group Ltd., New London, Conn.

[21] Appl. No.: 42,815

[22] Filed: Apr. 27, 1987

[51] Int. Cl.$^5$ ............................................... B60P 1/64
[52] U.S. Cl. .................................... 414/495; 414/786; 180/125
[58] Field of Search ............... 414/495, 786, 498, 400, 414/391–393; 180/125; 254/93 HP, 2 R, 2 B

[56] References Cited

U.S. PATENT DOCUMENTS

| | | | |
|---|---|---|---|
| 3,185,238 | 5/1965 | Coates | 180/125 |
| 3,209,929 | 10/1965 | Petersen et al. | 180/125 X |
| 3,261,418 | 7/1966 | Bertin | 180/9.1 |
| 3,466,010 | 9/1969 | Jung | 180/125 X |
| 3,796,279 | 3/1974 | Burdick et al. | 180/125 X |
| 3,822,761 | 7/1974 | Vaughen | 180/125 X |
| 3,831,708 | 8/1974 | Terry | 180/125 X |
| 3,950,038 | 4/1976 | Wood | 180/9.1 X |
| 3,958,701 | 5/1976 | Yatagai et al. | 414/392 X |
| 4,082,195 | 4/1978 | Wnek | 414/495 X |
| 4,240,773 | 12/1980 | Terry | 180/125 X |
| 4,440,253 | 4/1984 | Pernum | 180/116 |
| 4,518,151 | 5/1985 | Dill, Jr. | 254/93 HP |

FOREIGN PATENT DOCUMENTS 2840214  4/1979  Fed. Rep. of Germany.

OTHER PUBLICATIONS

Confidential Memorandum by Commodity Handling Systems, Inc., dated Oct., 1984.
"Air Bearing Transporter for Containerized Cargo" videotape, produced by Civil Engineering Lab, Naval Construction Battallion Center, Point Hueneme, Calif. Technical Note N-1385; Wolfe; Mar. 1975; "An Evaluation Of Air Bearing Systems For Cargo Movement In Marine Corps Supply".

Primary Examiner—David A. Bucci
Attorney, Agent, or Firm—Nixon & Vanderhye

[57] ABSTRACT

A method and assembly provide for the quick and effective one step loading and unloading of an overseas transport container, which can be accomplished by one operator and a minimum of effort. First, second, third, and fourth identical fingers each about 20' long have a plurality of air bearings associated with them, the air bearings connected up to a source of air under pressure. Inflatable load bars are provided on the tops of the fingers. At the first ends of the first and second fingers they are connected to a structural cross-member which is integral with a manifold for supplying air under pressure to the fingers for inflating the air bearings, and also mounts air-supplying structure for inflating the load bars. The third and fourth fingers are continuations of the first and second, and are utilized when loading or unloading a 40' container. During use the air bearings are inflated, the fingers are simultaneously moved underneath the pallet, load bars are inflated to lift the pallet off of the horizontal surface on which they are resting, the pallet is moved—utilizing a powered hand truck connected to the structural cross-member—into or out of the transport container, the load bars are deflated, and the fingers are simultaneously withdrawn from underneath the pallet.

9 Claims, 4 Drawing Sheets

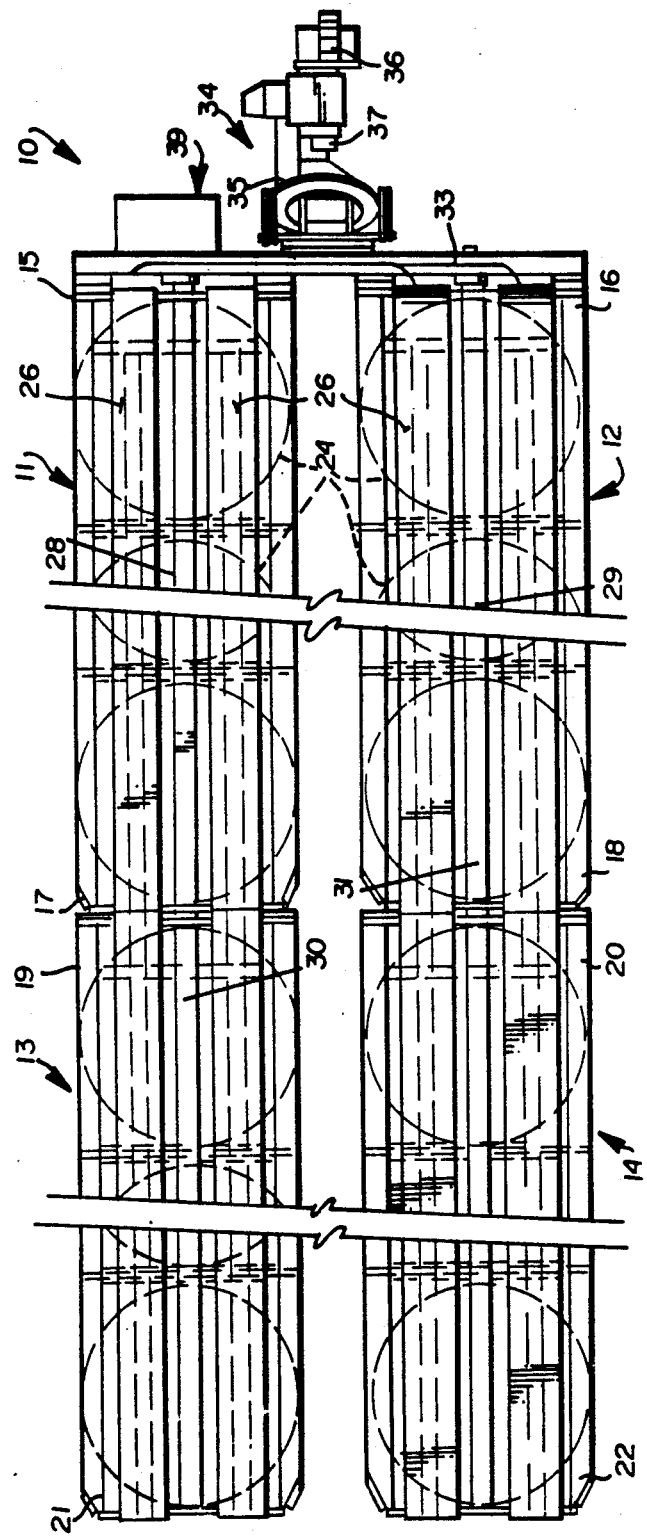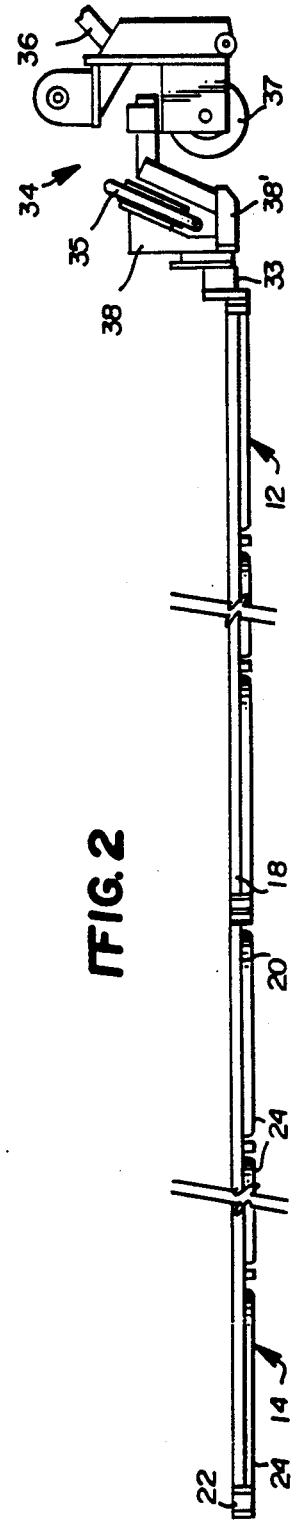

CONTAINER LOADING AND UNLOADING

BACKGROUND AND SUMMARY OF THE INVENTION

In the overseas (long distance) transportation of products, it has been desirable for many years—and it is becoming increasingly desirable—to transport goods in transport containers. Transport containers conventionally are in 20' and 40' sizes, and a wide variety of goods—but by no means all types of goods—can be transported by container.

Conventionally, transport containers are loaded and unloaded using fork lifts, and like devices. Typically, about 6-12 inches clearance space must be provided at the top of the goods in the container to allow effective access by a fork lift or the like, and container loading and unloading time can be significant.

According to the present invention, an assembly and method are provided for loading and unloading overseas transport containers that decrease the amount of head space that need be provided in the container (thereby increasing the amount of space for receipt of goods), enhance the variety of goods that can be effectively transported by container, can provide effective loading and unloading of the container (requiring only one operator) in approximately one minute, and accomplish these advantageous results in a simple, effective, and relatively inexpensive manner, the assembly structure utilizible for loading and unloading being less expensive than present conventional equipment.

According to one aspect of the present invention, an assembly for moving a heavy load out of or into an overseas transport container is provided which comprises the following elements: First and second substantially identical fingers, each having first and second ends and being of relatively rigid material (e.g., steel), and each having a plurality of air bearings disposed along the length of the bottom thereof. The air bearings are operatively connectable to a source of air under pressure mounted in association with its respective finger. The fingers have a height which is small enough to fit under a pallet in a container (or to be moved into the container). A structural cross-member holds the first and second fingers together at the first ends thereof so that they are spaced laterally from each other and extend substantially parallel to each other from the structural member. A manifold supplies air under pressure to both the fingers for inflating the air bladders simultaneously. Preferably, the structural cross-member and the manifold are a single integral structure. At least one, and preferably a pair of, inflatable load bars extend along the length of the top of each of the fingers. Means are provided for supplying air under pressure to the load bars, such means mounted in operative association with the structural cross-member and connected up to the same ultimate source of air pressure as the bladders. A powered hand truck (preferably with a steerable wheel) is mounted to the structural cross-member for effecting movement of the assembly. The hand truck also is particularly effective in applying a braking force to arrest assembly movement when desired.

While the first and second fingers, each being between about 19 and 20' long, are effective for loading or unloading a 20' container, in order to effectively load or unload a 40' container third and fourth fingers are also necessary, these fingers being substantially identical to the first and second fingers. The third finger is connected as a linear extension, by releasable fasteners such as bolts, to the first finger, while the second is connected to the fourth. Air is supplied through the first finger to the third finger for inflating the bladders, and hoses run the length of the first and second fingers for supplying air to the load bars of the third and fourth fingers, respectively.

According to another aspect of the present invention, a method of loading or unloading an overseas transport container with goods mounted on one or more pallets is provided. The method comprises the steps of: (a) Inflating the bladders of the fingers. (b) Moving the fingers, at the same time, underneath the pallet or pallets to be moved. This movement is accomplished manually by an operator, utilizing only a powered hand truck at the first end of the fingers. (c) Inflating the load bars on the fingers to lift the pallet or pallets off the horizontal surface on which they are resting. (d) Moving the pallet linearly into, or out of, a transport container. Again, this is accomplished manually, utilizing only the hand truck. (e) Deflating the load bars; and (f) removing the fingers, at the same time, from beneath the pallet or pallets. Again, this is accomplished manually, utilizing only the hand truck.

When a 40' container is to be loaded or unloaded instead of a 20' container, third and fourth fingers are connected up to the first and second fingers, and then steps (a) through (f) are practiced as set forth above. In order to provide a non-porous smooth surface to facilitate movement of the assembly, one can spread 4 mil plastic over the container floor, over a sheet metal bridge in the transition area between the container and loading dock, or like areas which the assembly will traverse. Also, the assembly (with mounted pallet(s) and goods) can be moved laterally utilizing the steerable wheel of the hand truck.

It is the primary object of the present invention to provide a simple, effective, and relatively inexpensive assembly and method for loading and unloading transport containers. This and other objects of the invention will become clear from an inspection of the detailed description of the invention and from the appended claims.

BRIEF DESCRIPTION OF THE DRAWINGS

FIG. 1 is a top view, with portions cut away for clarity of illustration, of an exemplary assembly according to the invention utilizing first through fourth fingers;

FIG. 2 is a side view of the assembly of FIG. 1;

DETAILED DESCRIPTION OF THE INVENTION

Figure 3:
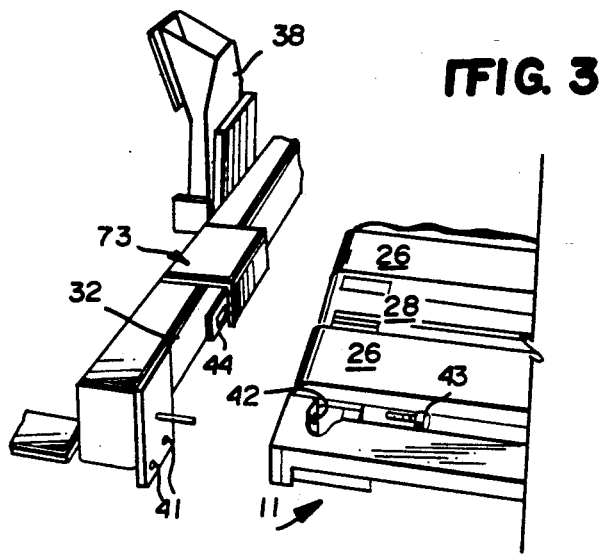
FIG. 3 is a perspective, exploded view of a portion of the assembly of FIG. 1, illustrating the interconnection between the structural cross-member/manifold and first finger.

An exemplary assembly 10 according to the present invention includes at least first and second fingers 11, 12, and when utilized for loading or unloading a 40' container, third and fourth fingers 13, 14 are provided. The fingers preferably are constructed of a relatively rigid material, such as steel. Each finger has first and second ends; the first and second fingers 11, 12 have first ends 15, 16 and second ends 17, 18, respectively, while the third and fourth fingers 13, 14, have first ends 19, 20, and second ends 21, 22, respectively. Each of the fingers 11-14 has a plurality of air bearings 24 on the bottom thereof.

Preferably seven conventional air bearings 24 are provided associated with each finger, each finger being between about 19 and 20' long. The air bearings may be obtained commercially from Air Float Corporation of Decatur, Ill., or others. Each bearing has a lift capability of about 8,000 pounds. Air under pressure is supplied to the bearings at about 16 psi and discharged at about 4 psi (a low pressure system) and the air flow is typically about 16 cubic feet per minute per bearing (although it can be as low as 8 ft.$^3$/min. per bearing and still function). If desired, check valves may be incorporated in the bearings in order to provide greater stability for maneuverability and shifting loads.

Each finger 11-14 also has associated therewith, on the top surface thereof, at least one load bar, and preferably a pair of inflatable load bars 26. The load bars are of inflatable, wear-resistant material. The free ends of the load bars 26 are inserted into slots in the vertical faces of the fingers 11-14, as illustrated at 26' in FIG. 5.

A central tubular portion is provided for each of the fingers 11-14 to supply air through the fingers to the air bearings 24. The supply of air to the bearings may be provided by perforations (not shown) in the bottom of the central tubular portions communicating with each of the bladders using a conventional short pipe nipple (not shown) for each bladder. The central tubular portions for the fingers 11-14 are illustrated by reference numerals 28, 29, 30, and 31, respectively. A combined metal structural cross-member and manifold 33 is connected to the first ends 15, 16 of the fingers 11, 12.

Operatively connected to the structural manifold element 33 is a commercially available powered hand truck (also known as a tractor) 34. Preferably the hand truck 34 includes an inflatable bladder 35, which is utilized to facilitate transfer of some of the load from the fingers 11, 12 to the hand truck; a handle 36 which includes controls for the hand truck thereon; and a steerable wheel 37. A support 38 rigidly attached to the member 33 connects the element 33 to the hand truck 34, as does a link 38'.

Figure 6:
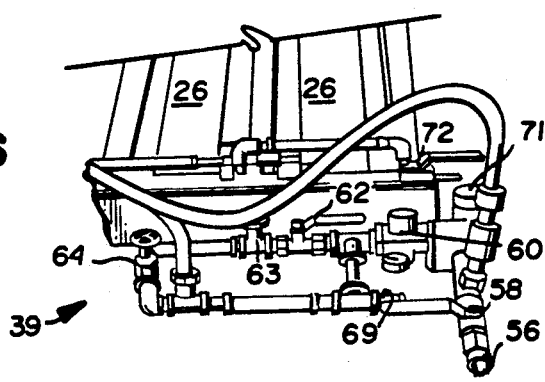
FIG. 6 is a top perspective view of the exemplary, fluidic components and controls for the supply of air under pressure to the load bars and air bearings of the assembly in FIG. 1.
Figure 7:
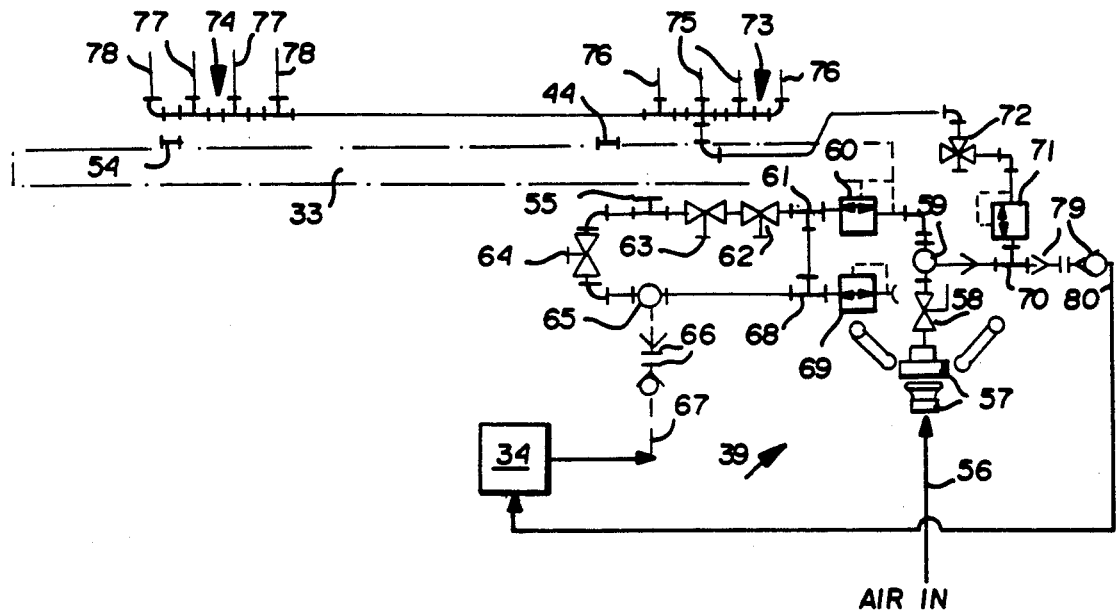
FIG. 7 is a fluidic circuit schematic of the apparatus in FIG. 6.

Also mounted on the element 33 are means for supplying air under pressure to the load bars 26, such means being schematically represented by reference numeral 39 in FIG. 1, and shown in detail in FIGS. 6 and 7.

One exemplary manner in which each of the fingers 11, 12 may be interconnected to the element 33 is illustrated schematically in FIG. 3 (for the element 11). A flange 41, having a pair of bolt receiving openings therein, extends downwardly from the end of the element 33, and cooperates with a portion 42 of the finger 11, the portion 42 also having a pair of openings therein for receipt of bolts 43 or like fasteners. Another set of flanges and fasteners is provided on the opposite side of the first end 15 of the finger 11. When the finger 11 is connected to the element 33, the air port 44 associated with the element 33 supplies air to the interior of the tubular element 28.

Figure 4:
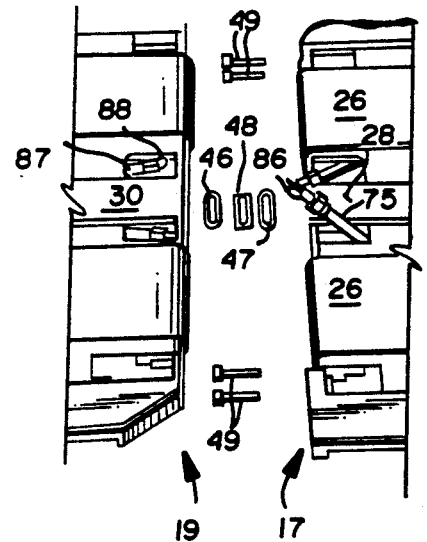
FIG. 4 is a top perspective, exploded view illustrating the interconnection between the first and third fingers of the assembly of FIG. 1.

FIG. 4 illustrates an exemplary interconnection between aligned fingers, in this case between the first and third fingers 11, 13. The central tubular air passageways 28, 30 are interconnected in air-tight relationship utilizing resilient material gaskets 46, 47 (e.g., of rubber), and metal (e.g., steel) ring 48. Gaskets 46, 47 have the same approximate circumferential configuration as the tubular passageways of the portions 30, 28, respectively, and engage the portions 30, 28, surrounding the hollow passageways therein. The metal ring 48 is sandwiched between the gaskets 46, 47. The fingers 11, 13 are held together by the sets of bolts 49 illustrated in FIG. 4 at opposite sides thereof, the bolts 49 cooperating with openings (not shown) in the portions 49' of the fingers 11, 13.

Figure 5:
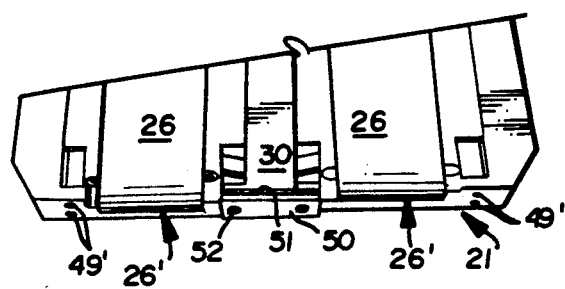
FIG. 5 is a top and perspective view of the third finger of the assembly of FIG. 1.

FIG. 5 illustrates an end termination of the fingers 13, 14, in particular, the end termination of the finger 13 being illustrated. A plate 50 having the same approximate configuration as the circumference of the tubular passageway of the portion 30 fits over and blocks the passageway in the portion 30 with a gasket 51 between the plate and the finger 13. Bolts 52 or the like hold the plate 50 in place on the element 13.

FIGS. 6 and 7 illustrate the various structures utilized to supply air to both the manifold 33 (ultimately supplied to the tubular portions 28-31 of the fingers 11-14, respectively), and also for supplying air to the load bars 26 for each of the fingers. The air-ports 44, 54 in the manifold 33 supply air from the interior of the manifold 33 to the finger tubular portions 28, 29, respectively, a T-connection 55 supplying air to the manifold 33.

The following elements supply the air to the bearings 24 associated with the fingers 11-13: The line (hose) 56 is connected to a source of compressed air at about 100 psi at the loading dock. Preferably quick connect/disconnect couplings 57 are provided for connection of the air hose 56 to the structure 39. Air passes through coupling 57 to the main on/off valve 58, which is preferably a hand operated ball valve. The air then passes through T-connection 59 to pressure regulator 60 for the air bearings (providing about a 16 psi maximum). The regulator 60 is connected to T-connection 61 which in turn is connected to the load on/off 1¼ inch hand operated ball valve 62, which in turn is connected to the adjustable load flow hand operated gate valve 63, and then to the connection 55. Also connected to connection 55 is the one inch hand operated globe valve 64, T-connection 65, quick connect/disconnect couplings 66, and line 67 which is the exhaust air line from the tractor 34. The other connection of the T-connection 65 is connected up to T-connection 68 and to relief valve 69 (preferably set at 20 psi maximum).

Air is also supplied from hose 56 to the load bars 26. Connector 59 is also connected to T-connection 70, which in turn is connected to regulator 71, hand-operated 3-way valve 72, and manifolds 73, 74. Extending from manifolds 73, 74 are hoses 75-78, the hoses 76 are connected to the load bars for the finger 11, the hoses 75 ultimately are connected to the load bars for the finger 13, the hoses 78 are connected to the load bars for the finger 12, and the hoses 77 are ultimately connected to the load bars for the finger 14.

The T-connector 70 is also connected through quick disconnect couplings 79 to the line 80 for supplying air to the tractor 34.

Figure 8:
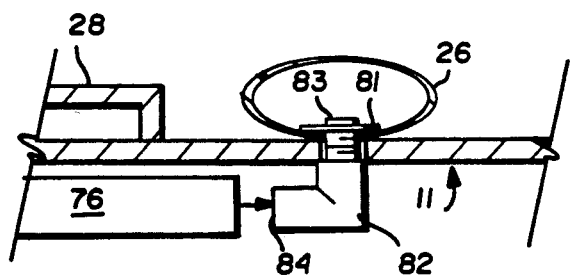
FIG. 8 is a side partial cross-sectional view of a portion of the first finger, illustrating the manner of interconnection of a load bar with an air hose.

FIG. 8 illustrates the manner in which a hose is connected to a load bar 26, in this case for the first finger 11. The hose 76 passes from the manifold 73 through an opening in the finger to the bottom of the finger, as illustrated in FIG. 8. Disposed in the interior of the load bar 26 is a nut 81 which receives the threaded end 83 of an L-shaped connector 82, the connector 82 end 84 being connected to the hose 76.

FIG. 4 also illustrated the manner in which air is supplied to the load bars 26 associated with the third and fourth connectors, in this case for the third connector 13. The hoses 75 are provided with couplings 86 at the ends thereof, and those couplings 86 cooperate with mating couplings 88 associated with hose sections 87 mounted on the finger 13 and passing from the top to the bottom thereof (the connection of the hose sections 87 to the load bars 26 associated therewith being the same as illustrated for the hose section 76 in FIG. 8).

Figure 9:
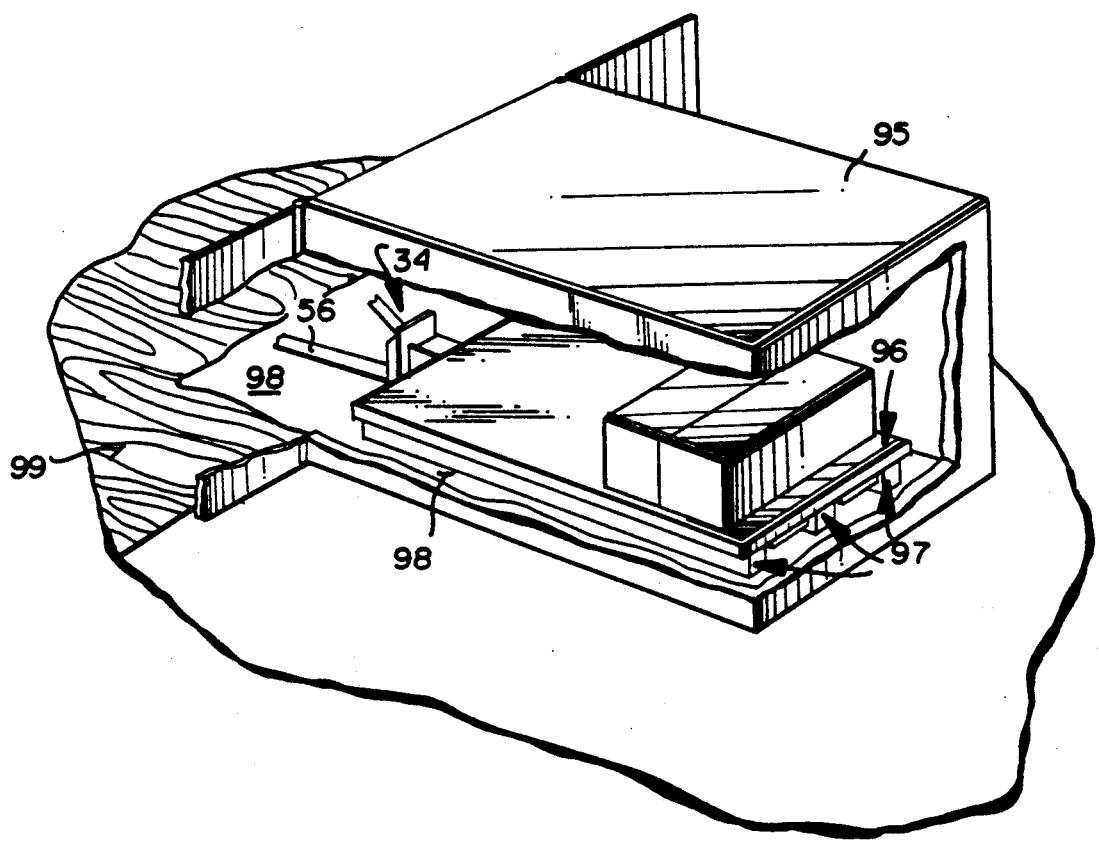
FIG. 9 is a perspective schematic view, with portions cut away for clarity, illustrating a transport container being loaded according to the invention.

An exemplary assembly 10 according to the invention having been described, an exemplary method according to the invention, which utilizes the assembly 10, will now be described, with reference in particular to FIG. 9. The method may comprise or consist of the recited steps, which preferably are practiced sequentially as set forth.

The air hose 56 is connected to the structure 39 by the elements 57, the main valve 58 and the load on/off valve 62 are opened, and the load flow valve 63 is adjusted to provide the desired flow to the manifold 33. Air flowing into manifold 33 and then through air ports 44, 54 thereof, passes into the tubular elements 28, 29 and inflates all of the bearings 24 associated with the fingers 11, 13. Using the hand truck 34, a single operator then moves the fingers 11, 13 simultaneously (being connected by the combined structural cross-member/manifold 33) so that they are inserted beneath the pallet 96, between the spacers 97 thereof, the pallet 96 adapted to be loaded into or unloaded from the long distance transport container 95.

In order to most easily accommodate the fingers 11, 13 (which—when the air bearings 24 are inflated—are about 4 inches high), the spacers 97 are preferably about 5 inches high.

Once the fingers 11' 13 of the assembly 10 are completely beneath the pallet 96 (which may be multiple pallets disposed end-to-end), the manually operated three-way valve 72 is operated to supply air under pressure to the manifolds 73, 74, which in turn supply air under pressure to the load bars 26 associated with the fingers 11, 13. The inflation of the load bars 26 causes the pallet 96 to be lifted off of the horizontal surface on which it is disposed. Then the hand truck 34 may be operated to move the pallet 96 into or out of the container 95. Because of a construction of the assembly 10, only 2 inches of clearance are necessary between the pallet 96 (with goods thereon) and the top of the container 95, whereas about 6 inches of clearance is necessary if the loading/unloading is done with a conventional fork lift.

If the surface which the assembly 10 is to traverse is less even than desired, 4 mil flexible plastic sheeting 98, or the like, may be laid over a container 95 bottom, a sheet metal bridge between the container 95 and the loading dock 99, and/or other portions of the pathway to be traversed, to provide a non-porous smooth surface for the air casters to move over. Also, in view of the provision of the steerable wheel 37 on the hand truck 34, the assembly 10 may be moved laterally, with the pallet 96 supported thereby, to facilitate direct transfer of the pallet 96 from the container 95 to a truck, train car, or the like that is at the loading dock.

Where a 40' container is to be loaded/unloaded instead of 20' container, the third and fourth fingers 13, 14 are connected up to the first and second fingers 11, 12, and the steps set forth above performed as indicated, the assembly in this case supporting the pallet (or pallets) which completely fill a container that is 40' long.

It will best be seen that according to the present invention, an exemplary assembly and method has been provided which effect the simple, inexpensive, and cost effective loading and unloading of containers.

While the invention has been described in connection with what is presently considered to be the most practical and preferred embodiments, it will be apparent to those of ordinary skill in the art that many modifications may be made thereof with the scope of the invention, which scope is to be accorded the broadest interpretation of the appended claims so as to encompass all equivalent structures and procedures.

What is claimed is:

1. An assembly for moving a heavy load on a pallet out of an overseas transport container comprising:

first, second, third and fourth substantially identical fingers, each between about 19' and 20' long, having first and second ends, and each having a plurality of air bearings disposed along the length of the bottom thereof, with each air bearing operably connected to a source of air under pressure associated with its respective finger, and dimensioned to fit under a pallet;

a structural cross-member holding said first and second fingers together at said ends thereof so that they are spaced laterally from each other and extend substantially parallel to each other from said structural member;

said third and fourth fingers operably connected to said first and second fingers, respectively, and extending parallel to and laterally spaced from each other, the first end of said third finger connected to the second end of said first finger, and the first end of said fourth finger connected to the second end of said second finger;

at least one inflatable load bar extending along the length of the top of each of said fingers;

means for supplying air under pressure to said load bars and to said air bearings for each of said fingers; and wherein each of said load bars is provided with compressed air from a common source, said first and second fingers being connected by a hose to a source of air under pressure, the hose extending on the bottom of the one of the first and second fingers with which it is associated, and connected up to the load bar adjacent the first end of that finger; and wherein each of said third and fourth fingers is operatively connected up to said source of air under pressure by a hose extending the entire length of the first or second finger, respectively, a first end connection being provided at the hose at the second end of each of said first and second fingers, and a hose section including a connection cooperating with said first connection extending from the first end of each of said third and fourth bars for connection to the at least one load bar associated with the respective third or fourth finger.

2. An assembly for moving a heavy load on a pallet out of an overseas transport container comprising:

first, second, third and fourth substantially identical fingers, each between about 19' and 20' long, having first and second ends, and each having a plurality of air bearings disposed along the length of the bottom thereof, with each air bearing operably connected to a source of air under pressure associated with its respective finger, and dimensioned to fit under a pallet;

a structural cross-member holding said first and second fingers together at said ends thereof so that they are spaced laterally from each other and extend substantially parallel to each other from said structural member;

said third and fourth fingers operably connected to said first and second fingers, respectively, and extending parallel to and laterally spaced from each other, the first end of said third finger connected to the second end of said first finger, and the first end of said fourth finger connected to the second end of said second finger;

at least one inflatable load bar extending along the length of the top of each of said fingers;

means for supplying air under pressure to said load bars and to said air bearings for each of said fingers; and wherein said means for supplying air to said air bearings includes: a central tubular passageway for each of said fingers, the central tubular passageways for said first and third fingers being aligned and connected in air-tight relationship, and the central tubular passageways for said second and fourth fingers being aligned and connected together in substantially an air-tight relationship; sealing means between said first and third and said second and fourth fingers' central tubular passageways; and an air-tight end termination at the second ends of said third and fourth fingers' central tubular passageways.

3. An assembly as recited in claim 2 wherein the air-tight sealing means between said first and third and second and fourth fingers, respectively, comprises a pair of gaskets, one engaging each of said first and third fingers, or said second and fourth fingers, respectively, and a metal element having a through-extending opening therein and sandwiched between said gaskets.

4. A method of loading or unloading an overseas transport container about 20' long with goods mounted on a pallet, the pallet with goods completely effectively filling the container, utilizing first and second fingers, each substantially as long as the container interior and having inflatable air bearings and inflatable load bars associated therewith, the fingers mounted together and connected to a source of air under pressure at a first end thereof, with the second end thereof remote from the first end, adapted to be inserted into a container for loading or unloading, said method comprising the steps of:

(a) inflating the air bearings;
(b) moving both fingers underneath the pallet, at the same time;
(c) inflating the load bars to lift the pallet off of a horizontal surface on which it is resting;
(d) moving the pallet linearly into, or out of, a transport container with the pallet vertically supported substantially only by the air inflating the air bearings and the load bars;
(e) deflating the load bars; and
(f) removing both the fingers, at the same time, from underneath the pallet.

5. A method as recited in claim 4 comprising the further step of laying down a sheet of flexible sheet material over the ground area to be traversed by the air bearings during the practice of steps (b) and (f) to facilitate movement therealong.

6. A method as recited in claim 4 comprising the further steps of connecting third and fourth fingers, substantially identical to the first and second fingers, to the first and second fingers, respectively, so that the length of each of the first and third fingers combined, and the second fourth fingers combined, is approximately 40'; and then repeating steps (a) through (f) for a 40' container.

7. A method as recited in claim 4 wherein the bottom of the pallet is approximately 5 inches off of the ground area, and the height of each finger, with the air bearings inflated but without inflation of the load bars, is approximately 4 inches from the ground area, and wherein step (c) is practiced to lift the pallet less than about two inches.

8. A method as recited in claim 4 wherein the fingers are connected at the first ends thereof to a hand truck; and comprising the further step of braking the movement of the fingers during the practice of any of steps (b) through (f) using the hand truck.

9. A method as recited in claim 8, wherein the hand truck has a steerable wheel, and comprising the further step of, between steps (c) and (d), moving the pallet laterally with the hand truck using the steerable wheel.

* * * * *